(12) United States Patent
Suominen

(10) Patent No.: US 9,910,983 B2
(45) Date of Patent: Mar. 6, 2018

(54) MALWARE DETECTION

(71) Applicant: F-Secure Corporation, Helsinki (FI)

(72) Inventor: Mikko Suominen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 14/765,698

(22) PCT Filed: Jan. 28, 2014

(86) PCT No.: PCT/EP2014/051650
§ 371 (c)(1),
(2) Date: Aug. 4, 2015

(87) PCT Pub. No.: WO2014/124806
PCT Pub. Date: Aug. 21, 2014

(65) Prior Publication Data
US 2015/0371039 A1    Dec. 24, 2015

(30) Foreign Application Priority Data

Feb. 12, 2013  (GB) .................................. 1302452.6
Dec. 23, 2013  (GB) .................................. 1322908.3

(51) Int. Cl.
*G06F 12/14*  (2006.01)
*G06F 21/55*  (2013.01)
*G06F 21/52*  (2013.01)
*G06F 21/56*  (2013.01)

(52) U.S. Cl.
CPC ............ *G06F 21/554* (2013.01); *G06F 21/52* (2013.01); *G06F 21/566* (2013.01)

(58) Field of Classification Search
CPC ......... G06F 21/52; G06F 21/56; G06F 21/566

USPC ............................................................ 726/23
See application file for complete search history.

(56) References Cited

U.S. PATENT DOCUMENTS 5,842,016 A  * 11/1998  Toutonghi ................. G06F 9/52
                                                707/999.202
7,945,953 B1   5/2011  Salinas et al. .................. 726/22
8,037,526 B1 * 10/2011  Satish ..................... G06F 21/52
                                                        711/6

(Continued)

OTHER PUBLICATIONS

Kao et al, Light-Weight Hardware Return Address and Stack Frame Tracking to Prevent Function Return Address Attack, 2009, IEEE, pp. 859-866.*

(Continued)

*Primary Examiner* — Luu Pham
*Assistant Examiner* — Jenise Jackson
(74) *Attorney, Agent, or Firm* — Harrington & Smith

(57) ABSTRACT

A method of detecting suspicious code that has been injected into a process. The method includes identifying suspicious executable memory areas assigned to the process and, for each thread in the process, inspecting a stack associated with the thread to identify a potential return address; determining whether or not the potential return address is located within a suspicious memory area; and, if the potential return address is located within a suspicious memory area, determining whether or not the instruction at the address preceding the potential return address is a function call and, if yes, determining that the potential return address is a true return address and identifying the thread and associated code as suspicious.

9 Claims, 5 Drawing Sheets

(56) References Cited

U.S. PATENT DOCUMENTS

| | | | | |
|---|---|---|---|---|
| 8,209,757 B1* | 6/2012 | Kennedy | G06F 21/53 | |
| | | | 713/164 | |
| 8,239,836 B1* | 8/2012 | Franz | G06F 11/1487 | |
| | | | 717/127 | |
| 8,966,511 B2* | 2/2015 | Kim | G06F 21/554 | |
| | | | 719/331 | |
| 9,177,136 B2* | 11/2015 | Ishiyama | G06F 21/52 | |
| 9,336,390 B2* | 5/2016 | Pavlyushchik | G06F 21/566 | |
| 9,411,953 B1* | 8/2016 | Kane | G06F 21/566 | |
| 2006/0230388 A1 | 10/2006 | Hatfield et al. | 717/127 | |
| 2007/0089088 A1* | 4/2007 | Borde | G06F 21/52 | |
| | | | 717/106 | |
| 2007/0089171 A1* | 4/2007 | Aharon | G06F 21/55 | |
| | | | 726/22 | |
| 2008/0148399 A1 | 6/2008 | Winkler | 726/22 | |
| 2011/0225213 A1* | 9/2011 | Mosier | G06F 9/325 | |
| | | | 707/813 | |
| 2011/0265182 A1 | 10/2011 | Peinado et al. | 726/24 | |
| 2012/0047579 A1* | 2/2012 | Ishiyama | G06F 21/52 | |
| | | | 726/23 | |
| 2012/0198554 A1* | 8/2012 | Mathur | G06F 21/577 | |
| | | | 726/24 | |
| 2012/0255014 A1* | 10/2012 | Sallam | G06F 21/554 | |
| | | | 726/24 | |
| 2013/0227680 A1* | 8/2013 | Pavlyushchik | G06F 21/00 | |
| | | | 726/21 | |
| 2014/0157366 A1* | 6/2014 | Ko | H04L 63/0227 | |
| | | | 726/3 | |
| 2014/0189358 A1* | 7/2014 | Grimen | H04N 7/1675 | |
| | | | 713/171 | |

OTHER PUBLICATIONS

Fatayer et al, OverCovert: Using Stack-Overflow Software Vulnerability to Create a Covert Channel, 2011, IEEE, pp. 1-5.*

* cited by examiner

MALWARE DETECTION

TECHNICAL FIELD

The present invention relates to detection of malware on a computer system, and in particular to detection of suspicious code injected into system processes.

BACKGROUND

The term "malware" is short for malicious software and is used to refer to any software designed to infiltrate or damage a computer system without the owners informed consent. Malware can include viruses, worms, trojan horses, rootkits, adware, spyware and any other malicious and unwanted software. Many computer devices, such as desktop personal computers (PCs), laptops, personal data assistants (PDAs) and mobile phones can be at risk from malware. Computer systems running the Windows™ operating system are particularly at risk from malware, but all operating systems will be at some risk. Examples of other operating systems that could be at risk are Mac OS™, Linux™, Android™, iOS™, Windows Mobile™, and Blackberry OS™.

Computer users will typically run antivirus (AV) and/or internet security (IS) software applications, for example F-Secure's™ Anti-Virus and Internet Security applications, to detect malware and protect against malware attacks on their computer system. Detecting malware is challenging, as malware is usually designed to be difficult to detect, often employing technologies that deliberately hide the presence and processes of malware on a system. Consequently, anti-virus and internet security applications will use a large number of techniques in order to detect malware effectively, and reduce the risk of any malware going undetected.

A common method of detecting malware is to use code analysis. A database of "signatures" is accessible by the AV and/or IS software that contains signatures which are representative of code/features typically found in malware, or known to be found in a specific instance of malware. During scanning of a system, if code is found that matches one of the signatures in the database, then it can be flagged as suspicious, or flagged as malware as appropriate, and the appropriate course of action to quarantine and/or remove the malware from the system can be taken.

Unfortunately, due to the large amount and constantly evolving nature of malware that is created to attack computer systems (for example using obfuscation techniques), these methods of detecting malware using signatures are not completely effective in identifying all malware threats. In addition, signature based detection is not at all effective against "zero-day attacks", e.g. an attack that exploits a previously unknown vulnerability in a computer application, so at the time the attack is made there is no awareness of the vulnerability, or that employs obfuscated code that bears little resemblance to known code. In order to effectively protect against zero day attacks, heuristic methods are used to try and detect suspicious behaviour that might be indicative of malware. Again, as explained above, it is best to use a variety of heuristic methods concurrently to provide the highest level of protection.

Sophisticated malware may attempt to remain undetected by not running as a separate process but by running its code as part of a system process. One example of a Windows system process that is often "hijacked" in this way is explorer.exe. System process hijacking is of particular concern to likely targets for cyber attacks such as important computer systems containing sensitive information, or individual processes such as a web browser for home computer users that is used for accessing online banking services.

For these reasons, it is important that anti-virus products and/or system forensic tools that detect malware infections use techniques that can detect suspicious code that is running on a system without having to know the details of the code.

As already mentioned, AV and IS applications utilise a number of detection methods when scanning for malware. There is of course always a need to add further detection methods, and in particular methods that can help to defeat zero day attacks.

SUMMARY

It is an object of the present invention to provide a method of detecting suspicious code running on a system (and in particular, within a system process) without prior knowledge of the malware code specifics, malware family, location of the malicious file on the disc or any specific previous knowledge of the malware. This can be achieved by identifying threads which are executing code that has been injected into the process using a method other than those originally designed to be used by software developers.

According to a first aspect of the invention there is provided a method of detecting suspicious code that has been injected into a process being run on a computer system. The method comprises: identifying suspicious executable memory areas assigned to the process and, for each thread in the process, inspecting a stack associated with the thread to identify a potential return address; determining whether or not the potential return address is located within a suspicious memory area; and, if the potential return address is located within a suspicious memory area, determining whether or not the instruction at the address preceding the potential return address is a function call and, if yes, determining that the potential return address is a true return address and identifying the thread and associated code as suspicious.

The step of identifying suspicious memory areas may comprise collecting a first list of memory areas that contain modules that have been loaded to the process; then collecting a second list of all memory areas for the process that are executable but not in the first list, the entries in the second list corresponding to identified suspicious memory areas.

The step of collecting the first list may comprise using the Windows Module32First and Module32Next APIs.

The step of collecting the second list containing suspicious memory areas may comprise collecting a list of all executable memory areas for the process and removing from that list the memory areas of the modules in the first list.

Collecting a list of all executable memory areas for the process may comprise using the Windows VirtualQueryEx API and inspecting the MEMORY_BASIC_INFORMATION returned by the function.

The step of inspecting the stack associated with the thread to identify a potential return address may comprise: locating a memory area that contains the stack for the thread, and inspecting the stack in portions of a minimum memory allocation.

The step of locating the memory area that contains the stack for the thread may comprise: obtaining a value of an Extended Stack Pointer (ESP) register by calling the Windows API GetThreadContext; and calling the Windows API VirtualQueryEx for the retrieved ESP register value.

The method may further comprise searching the memory areas belonging to any thread found to be running suspicious code for identifiers that provide an indication of which malicious executable has performed the injection into the process.

According to a second aspect of the invention there is provided an apparatus comprising: an identifying module for identifying suspicious executable memory areas assigned to a process being run on a computer system; a first inspection module for inspecting a stack associated with the thread to identify a potential return address; a processing module configured to determine whether the identified potential return address is located within a suspicious memory area; a second inspection module configured to determine whether or not the instruction at the address preceding the potential return address is a function call; and a result handling module for determining that the potential return address is a true return address and that the thread and associated code is suspicious if the instruction at the address preceding the potential return address is a function call.

The identifying module may be configured to collect a first list of memory areas that contain modules that have been loaded to the process; then collect a second list of all memory areas for the process that are executable but not in the first list, the entries in the second list corresponding to identified suspicious memory areas.

The identifying module may be configured to collect the first list using the Windows Module32First and Module32Next APIs.

The identifying module may be configured to collect the second list by collecting a list of all executable memory areas for the process and removing from that list the memory areas of the modules in the first list.

The first identifying module may be configured to use the Windows VirtualQueryEx API and inspect the MEMORY_BASIC_INFORMATION returned by the function in order to collect a list of all executable memory areas for the process.

The first inspection module may be configured to: locate a memory area that contains the stack for the thread; and inspect the stack in portions of a minimum memory allocation.

The first inspection module may be configured to inspect the stack associated with the thread using: a locating module for locating the memory area containing the stack for the thread; and a stack processing module for processing the entire memory area containing the stack for the thread to identify a potential return address.

The locating module for locating the stack area for the thread may be configured to obtain a value of an Extended Stack Pointer (ESP) register by calling the Windows API GetThreadContext; and then call the Windows API VirtualQueryEx for the retrieved ESP register value.

The apparatus may further comprise a searching module for searching the memory areas belonging to any thread found to be running suspicious code for identifiers that provide an indication of which malicious executable has performed the injection into the process.

According to a third aspect of the invention there is provided a computer system comprising: one or more processors; and one or more computer-readable memories storing computer program code, the one or more processors being configured to execute the computer program code to cause the computer system at least to: identify suspicious executable memory areas assigned to a process being run on the computer system; and for each thread in the process, inspect a stack associated with the thread to identify a potential return address; determine whether or not the potential return address is located within a suspicious memory area; and if the potential return address is located within a suspicious memory area, determine whether or not the instruction at the address preceding the potential return address is a function call and, if yes, determine that the potential return address is a true return address and identifying the thread and associated code as suspicious.

The one or more processors may be configured to execute the computer program code to further cause the computer system to terminate any threads found to be running suspicious code that has been injected into the process.

BRIEF DESCRIPTION OF THE DRAWINGS

Further aspects, features and advantages of the invention will become apparent to the reader from the following description of specific embodiments of the invention, provided by way of example only, with reference to the accompanying drawings, in which.

DETAILED DESCRIPTION

Figure 1:
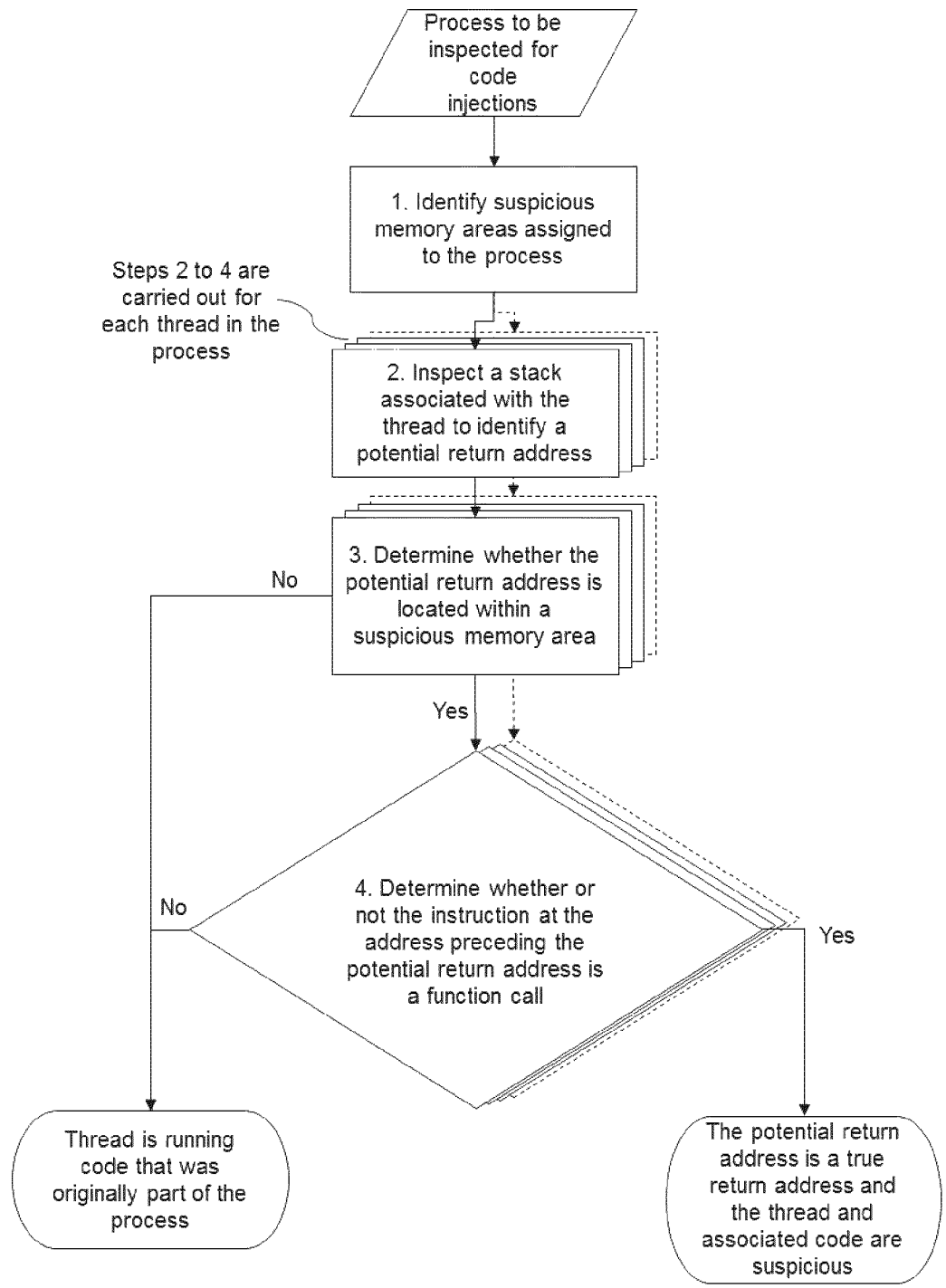
FIG. 1 is a flow diagram illustrating a method of detecting processes running injected suspicious code.

As discussed above, malware that is created to attack computer systems (for example running Windows™ operating systems such as Windows XP, Vista, Windows 7, Windows 8, Windows Mobile, Windows RT or any future version, or for example Mac™ operating systems such as Tiger, Leopard, Snow Leopard, Lion, Mountain Lion or any future version) is constantly evolving, and improved techniques are required that can detect suspicious code running on a system without requiring knowledge of the details of the code. A particular problem to be addressed is that of malware that attempts to remain undetected by not running as a separate process but instead by running its code as part of a system process.

The examples and embodiments described herein refer to the Windows platform, however it will be understood by the skilled person that the methods and systems can be applied to other operating systems, and this will fall within the scope of the present invention.

A new method and apparatus will now be described, with reference to the figures, that facilitates the detection of suspicious code running on a system (and in particular, within a system process) without prior knowledge of the malware code specifics, malware family, location of the malicious file on the disc or any specific previous knowledge of the malware. Importantly, detection is not dependant on signature detection based on the code that has been injected.

"Resources" (such as code and/or data) can be loaded into a process which is running on a computer system as process modules. These process modules are typically in the form of Dynamic Link Libraries (DLLs), but other code, which may be suspect or malicious, can also be injected into a process. In Windows API, the DLL files are organized into sections.

Each section has its own set of attributes, such as being writable or read-only, executable (for code) or non-executable (for data), and so on.

"Threads" are sequences of programmed instructions contained within a process that can execute code that has been loaded into a process. Each thread within a process shares the address space of the process to which it belongs, and the address space can include memory addresses for executable memory areas that are available to that process. The address space for each process is private and cannot be accessed by other processes unless it is shared.

The new method described herein detects code injected to system processes (or other previously known processes) by identifying threads (the sequences of programmed instructions contained within a process) that are executing code which has been injected to the process using a method other than those originally designed to be used by software developers (e.g. as a DLL). This method allows the detection of code that has been injected not only into system processes but also any other process whose own code is executed only from the main module or DLLs which have been loaded using normal APIs.

More particularly, threads are identified that are executing code which has been injected to the process using a method other than one intended to be used by software developers, i.e. "hijack threads". Hijack threads can be threads that were pre-existing in the process and that have been modified to harness the process for malicious purposes, or can be new threads that were started by the malware within the process. The process of identifying hijack threads involves first separating a process's user memory space (or "memory area") into two distinct executable ranges: one that is likely to be legitimate and another that is suspicious. Once this is done, it can be deduced which memory block (i.e. which of the two distinct executable ranges) contains the code being executed by each thread, by inspecting the stack of each thread.

The method involves four main steps, as shown in the flow diagram of FIG. 1. For a process that is to be inspected for code injections, these steps are:
  1. Identify suspicious executable memory areas assigned to the process that is being run on the computer system.
  Then for each thread in the process, perform the following steps:
  2. Inspect the stack associated with the thread to identify a potential return address.
  3. Determine whether or not the potential return address is located within a suspicious memory area.
  4. If the potential return address is located within a suspicious memory area, determine whether or not the instruction at the address preceding the potential return address is a function call. If this is the case, the potential return address is a true return address and the thread and associated code are identified as suspicious.

Figure 2:
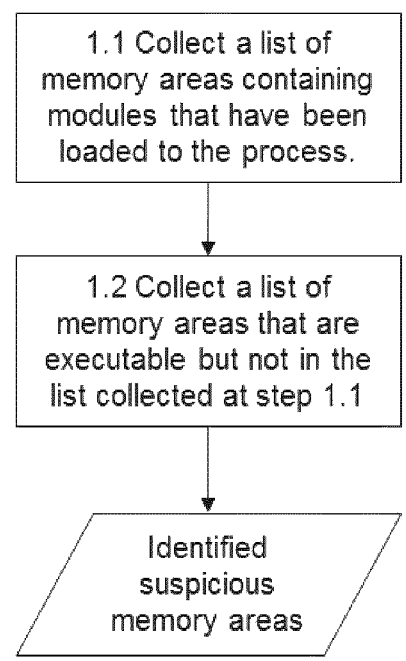
FIG. 2 is a flow diagram illustrating a method of carrying out step 1 of the method of FIG. 1.

In step 1, suspicious executable memory areas that have been assigned to the process are identified. This can be carried out, for example, using the method shown in the flow diagram of FIG. 2. The steps of this method are:
  1.1. Collect a list of memory areas containing modules (i.e. resources such as data and/or code) that have been loaded to the process.
  1.2. Collect a list of memory areas for the process that are executable but not in the list collected at step 1.1.

In step 1.1, a list is collected of memory areas containing modules that have been loaded to the process being inspected for code injections. This list can be created, for example, using the Windows APIs Module32First and Module32Next. The entries in this list will correspond to memory areas that are not considered suspicious.

In step 1.2, a list of memory areas that are executable but not in the list collected at step 1.1 is collected. This can be carried out, for example, by creating a list of all executable memory areas and then removing from this list the memory areas that are contained in the list collected in step 1.1. Alternatively, a new list could be created to which are added executable memory areas that are in the list of all executable memory areas but not in the list collected in step 1.1. For example, executable memory areas can be collected using the Windows API VirtualQueryEx by inspecting the MEMORY_BASIC_INFORMATION data structure returned by the function. The memory areas in the list returned from step 1.2 are executable memory areas that are considered suspicious and have potentially arisen from malware injections.

Figure 4:
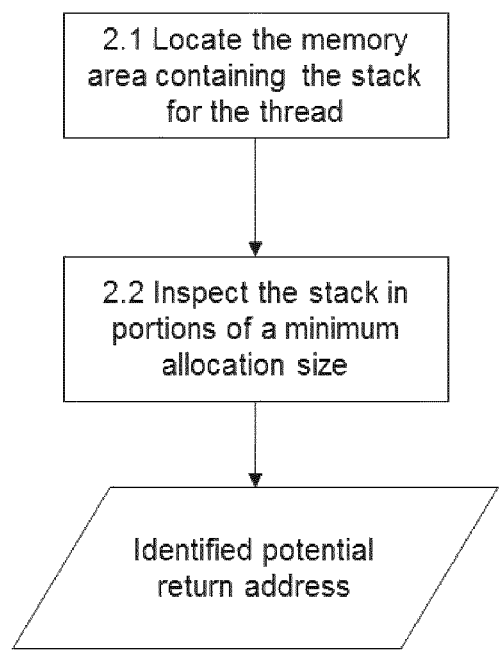
FIG. 4 is a flow diagram illustrating a method of carrying out step 2 of the method of FIG. 1.

The remaining steps in FIG. 1 (steps 2, 3 and 4) are carried out for each thread in the process. In step 2, the stack associated with the thread is inspected to identify a potential return address. The flow diagram of FIG. 4 provides an overview of the method used to identify a potential return address:

In step 2.1, the memory area containing the stack is located by obtaining the value of the Extended Stack Pointer (ESP) register, for example by calling the Windows API GetThreadContext, and then calling VirtualQueryEx for the retrieved ESP register value.

Figure 3:
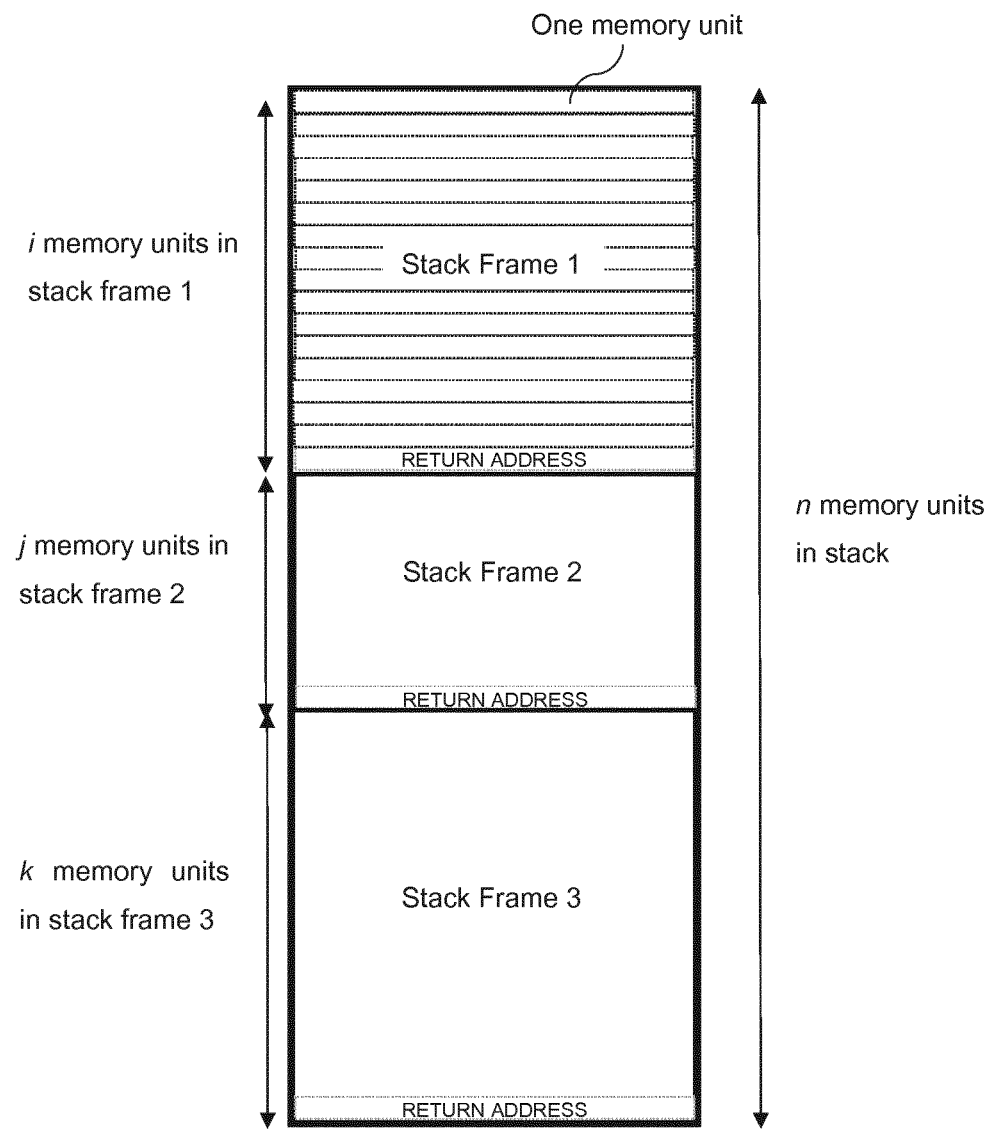
FIG. 3 is a schematic illustration of a stack containing stack frames that consist of an integer number of memory units, where each memory unit is a portion of minimum memory allocation.

The stack will contain a stack frame for each function that has been called, but not yet returned from, and also a stack frame for each function that has already been returned from but for which additional calls have not yet lead to overwriting the relevant portions on the stack. FIG. 3 shows a schematic illustration of a stack containing three stack frames. As shown in FIG. 3, each stack frame in the stack will contain a return address at its end, and it is this return address that is used to determine whether or not the thread is running code that is located in a suspicious memory area, and thus whether or not the thread and its associated code are suspicious.

It would be possible to inspect every memory location in the stack to find a potential return address, but this would be inefficient and would also increase the risk of incorrectly considering a value that happens to point to an executable memory area as a return address since there will be an increased number of candidates to be checked. In the method proposed here, the stack is inspected more efficiently by exploiting the fact that the stack memory is allocated in portions of a minimum memory allocation, or memory units. No return addresses will be skipped as the return addresses are the same size as the minimum allocation unit and the stack grows and shrinks in increments of this amount so return addresses will always be fully contained within one allocation unit.

In FIG. 3 the stack contains n memory units, and each stack frame consists of an integer number of memory units (with i memory units in Stack Frame 1, j memory units in Stack Frame 2 and k memory units in Stack Frame 3); it is therefore known that a return address (which will be located at the end of a stack frame) will be located at the end of one of the memory units. [The return address will comprise exactly one memory unit since the minimum allocation size is the same as the length of the return address.] The stack is therefore inspected in portions of the minimum memory allocation, as illustrated in step 2.2 of FIG. 4. This process of inspecting the stack in portions of the minimum memory allocation is used to identify potential return addresses; the addresses found in this inspection process are identified as potential return addresses because it is possible that a piece of data located at the end of a minimum memory allocation unit may resemble a return address but may not be a true return address.

In step 3 of FIG. 1, it is determined whether or not the potential return address identified in step 2 is located within the suspicious memory areas identified in step 1. If it is, then the method continues to step 4.

Finally, in step 4 of FIG. 1, it is determined whether or not the instruction at the address preceding the potential return address is a function call. The machine language instruction before the possible return address location can be analysed to see if is a call instruction by checking it's operation code. The operation code consists of one or more bytes at the beginning of the instruction; the rest of the instruction is the operand which for call instructions defines the target address of the call. There are many different types of call instructions but the total length of each different call instruction is always the same so the location of the operation code relative to the possible return address is known. For example if the byte located at a location five bytes before the possible return address is 0xE8, then the instruction before the return address is a call instruction. The target of the call is checked to eliminate interpreting, for example, the operand of another instruction as the operation code of a call instruction since different types of instructions have different lengths. If the instruction at the address preceding the potential return address is a function call, it is determined that the potential return address is a true return address, and the thread and associated code are identified as suspicious, i.e. the thread is identified as a hijack thread.

Hijack threads can then be dealt with in an appropriate way. Hijack threads may be dealt with directly by terminating or suspending them. However, this can cause instability to the system if terminating or suspending a hijack thread leads in turn to the process containing that hijack thread being terminated abnormally. A further consideration is that, if a hijack thread is simply terminated, after a restart of the computer system the malicious thread could simply be re-created by the malware that performs the injection.

A more robust solution is to perform further analysis to find which malicious program performed the injection. This can be achieved, for example, by searching the memory areas identified as belonging to the hijack thread for "clues" (e.g. file names, paths, registry key names, etc.) that lead to the malicious executable that has performed the injection into the process.

Figure 5:
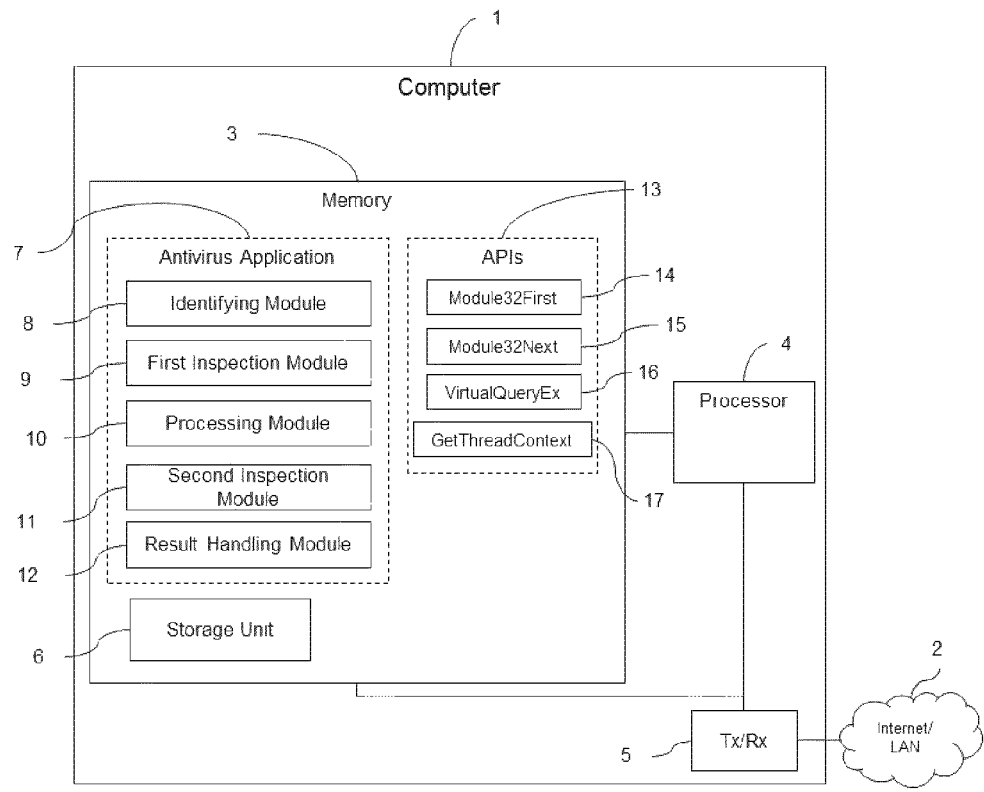
FIG. 5 is a schematic illustration of a computer system according to an embodiment.

FIG. 5 illustrates schematically a computer system comprising a computer 1 connected to a network 2 such as the internet or a local area network (LAN). The computer 1 is implemented as a combination of computer hardware and software. The computer 1 comprises a memory 3, a processor 4 and a transceiver 5. The memory 3 stores the various programs/executable files that are implemented by the processor 4, and also provides a storage unit 6 for any required data. The programs/functions/executable files stored in the memory 3, and implemented by the processor 4, include an Identifying Module 8, a First Inspection Module 9, a Processing Module 10, a Second Inspection Module 11, and a Result Handling Module 12, each of which can be sub-units of an antivirus application 7 (or internet security application). In addition, the memory 3 stores the Application Programming Interfaces (APIs) 13 to which processes can make function calls. FIG. 5 shows the Module32First (14), the Module32Next (15), the VirtualQueryEx (16) and the GetThreadContext (17) APIs as examples.

The transceiver 5 is used to communicate over the network 2, and can be used by the antivirus software 7 to communicate with, for example, a central server or cluster of servers maintained by the antivirus software provider (not shown). Typically, the computer 1 may be any of a desktop personal computer (PC), laptop, personal data assistant (PDA), mobile phone, or any other suitable device.

The antivirus application 7 uses the Identifying Module 8 to carry out step 1 of the method of FIG. 1 described above. The first identifying module 8 is configured to use the Module32First 14 and the Module32Next 15 APIs to create a list of memory areas containing modules that have been loaded to a process being inspected, and then use the VirtualQueryEx API 16 to collect a list of memory areas that are executable but not in the list collected at step 1.1.

Figure 6:
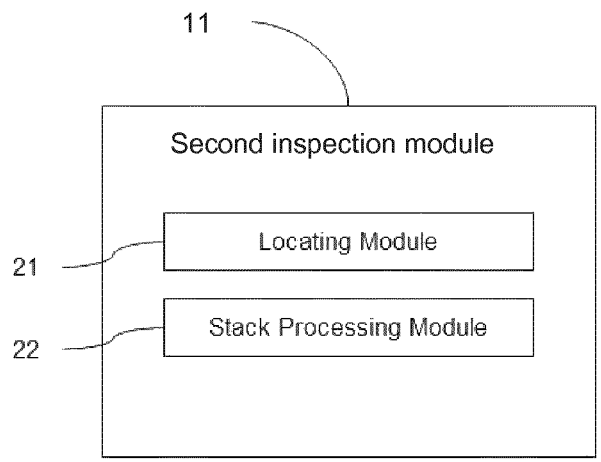
FIG. 6 is a schematic illustration showing sub-modules provided in a module of the computer system of FIG. 5.

The First Inspection Module 9 is then used to carry out step 2 of the method of FIG. 1, calling on the GetThreadContext 17 and VirtualQueryEx 16 APIs as required. The First Inspection Module can itself comprise a number of modules that allow it to carry out the steps of the method of FIG. 4. FIG. 6 shows the second identifying module 9 comprising a number of sub-modules, the sub-modules comprising a locating module 21 for carrying out step 2.1 and a stack processing module 22 for carrying out step 2.2.

The Processing Module 10 is then able to carry out step 3 of the method described in FIG. 1 above, and the Second Inspection Module 11 can then carry out step 4 of the method of FIG. 1. Finally the Result Handling Module 12 can be used to determine that the thread in question is running suspicious code that was not originally part of the process as described in step 4 of the method. The Result Handling Module 12 may also be used to initiate further actions as a consequence of the result. For example, the Result Handling module (or some other module on receiving instructions from the Result Handling module) may terminate the process and/or thread that has been found to be running suspicious injected code. The Result Handling module may also engage other aspects of the antivirus application, which can, for example, quarantine or delete the malware from which the injected suspicious code originated. For example, a searching module may be provided (not shown) which searches the memory areas belonging to any thread found to be running suspicious code for identifiers that provide an indication of which malicious executable has performed the injection into the process.

It will be appreciated by the person of skill in the art that various modifications may be made to the above described embodiments without departing from the scope of the present invention. For example, it will be appreciated that alternative APIs to those mentioned above could be used to achieve the same result. For example, Module32First and Module32Next could be replaced with Module32FirstW and Module32NextW respectively. Other examples of alternatives could be NtGetContextThread in place of GetThreadContext, and NtQueryVirtualMemory in place of VirtualQueryEx, but these are undocumented and not intended to be used in Windows applications. There may also be some APIs used in kernel-mode programming that would work as alternatives. It will also be understood by the person skilled in the art that future new APIs could be used to achieve the same functionality in Windows and other operating systems, and that these are covered within the scope of this invention.

The invention claimed is:

1. A method of detecting suspicious code that has been injected into a process being run on a computer system, the method comprising:

identifying suspicious executable memory areas assigned to the process and, for each thread in the process, inspecting a stack associated with the thread to identify a potential return address;

determining whether or not the potential return address is located within a suspicious memory area; and in response to the potential return address being located within the suspicious memory area, determining whether or not an instruction at the address preceding the potential return address is a function call and, if yes, determining that the potential return address is a true return address and identifying the thread and associated code as suspicious, wherein the identifying suspicious executable memory areas comprises collecting a first list of memory areas that contain modules that have been loaded to the process and then collecting a second list of all memory areas for the process that are executable but not in the first list, the entries in the second list corresponding to identified suspicious memory area, and wherein the collecting the second list containing suspicious memory areas comprises collecting a list of all executable memory areas for the process and removing from that list the memory areas of the modules in the first list.

2. The method as claimed in claim 1, wherein the inspecting the stack associated with the thread to identify a potential return address comprises:

locating a memory area that contains the stack for the thread; and inspecting the stack in portions of a minimum memory allocation.

3. The method as claimed in claim 1, further comprising searching the memory areas belonging to any thread found to be running suspicious code for identifiers that provide an indication of which malicious executable has performed the injection into the process.

4. An apparatus comprising:

at least one processor; and a memory including executable files, where the memory and the executable files are configured, with the at least one processor, to cause the apparatus to perform operations comprising:

identifying suspicious executable memory areas assigned to a process being run on a computer system;

inspecting a stack associated with the thread to identify a potential return address;

determining whether the identified potential return address is located within a suspicious memory area;

determining whether or not an instruction at the address preceding the potential return address is a function call; and determining that the potential return address is a true return address and that the thread and associated code is suspicious if the instruction at the address preceding the potential return address is a function call, wherein the identifying suspicious executable memory areas comprises collecting a first list of memory areas that contain modules that have been loaded to the process and then collecting a second list of all memory areas for the process that are executable but not in the first list, the entries in the second list corresponding to identified suspicious memory area, and wherein the collecting the second list containing suspicious memory areas comprises collecting a list of all executable memory areas for the process and removing from that list the memory areas of the modules in the first list.

5. The apparatus as claimed in claim 4, wherein the memory including the executable files is configured with the at least one processor to cause the apparatus to perform operations comprising:

locating a memory area that contains the stack for the thread; and inspecting the stack in portions of a minimum memory allocation.

6. The apparatus as claimed in claim 5, wherein the memory including the executable files is configured with the at least one processor to cause the apparatus to perform operations comprising:

inspecting the stack associated with the thread including:

locating the memory area containing the stack for the thread; and processing the entire memory area containing the stack for the thread to identify a potential return address.

7. The apparatus according to claim 4, wherein the memory including the executable files is configured with the at least one processor to cause the apparatus to perform operations comprising:

searching the memory areas belonging to any thread found to be running suspicious code for identifiers that provide an indication of which malicious executable has performed the injection into the process.

8. A computer system comprising:

one or more processors; and one or more computer-readable memories storing computer program code, the one or more processors being configured to execute the computer program code to cause the computer system at least to:

identify suspicious executable memory areas assigned to a process being run on the computer system; and for each thread in the process, inspect a stack associated with the thread to identify a potential return address;

determine whether or not the potential return address is located within a suspicious memory area; and in response to the potential return address being located within the suspicious memory area, determine whether or not an instruction at the address preceding the potential return address is a function call and, if yes, determine that the potential return address is a true return address and identifying the thread and associated code as suspicious, wherein the identifying suspicious executable memory areas comprises collecting a first list of memory areas that contain modules that have been loaded to the process and then collecting a second list of all memory areas for the process that are executable but not in the first list, the entries in the second list corresponding to identified suspicious memory area, and wherein the collecting the second list containing suspicious memory areas comprises collecting a list of all executable memory areas for the process and removing from that list the memory areas of the modules in the first list.

9. The computer system according to claim 8, wherein the one or more processors are configured to execute the computer program code to further cause the computer system to terminate any threads found to be running suspicious code that has been injected into the process.

* * * * *